United States Patent
Moussu et al.

(10) Patent No.: US 7,532,662 B2
(45) Date of Patent: May 12, 2009

(54) METHOD OF DELAYING SYMBOLS WITHIN A "RAKE" RECEIVER, AND CORRESPONDING "RAKE" RECEIVER

(75) Inventors: Benoît Moussu, Crolles (FR); Steven Fluxman, Crolles (FR)

(73) Assignee: STMicroelectronics SA, Montrouge (FR)

( * ) Notice: Subject to any disclaimer, the term of this patent is extended or adjusted under 35 U.S.C. 154(b) by 947 days.

(21) Appl. No.: 10/849,543

(22) Filed: May 19, 2004

(65) Prior Publication Data

US 2004/0264556 A1   Dec. 30, 2004

(30) Foreign Application Priority Data

May 20, 2003   (FR)   .................. 03 06009

(51) Int. Cl.
H04B 1/707   (2006.01)
(52) U.S. Cl. .................................... 375/148
(58) Field of Classification Search ............ 375/130, 375/140, 147, 148, 150, 152, 316, 324, 340, 375/343, 345, 346, 347, 349; 455/130, 132, 455/137
See application file for complete search history.

(56) References Cited

U.S. PATENT DOCUMENTS

| | | | | |
|---|---|---|---|---|
| 5,889,815 A | * | 3/1999 | Iwakiri | 375/148 |
| 6,058,138 A | * | 5/2000 | Fukumasa et al. | 375/130 |
| 6,580,771 B2 | * | 6/2003 | Kenney | 375/346 |
| 7,023,901 B2 | * | 4/2006 | Papasakellariou | 375/147 |
| 7,039,096 B2 | * | 5/2006 | Han | 375/148 |
| 7,280,585 B2 | * | 10/2007 | Sriram et al. | 375/148 |
| 2002/0168935 A1 | * | 11/2002 | Han | 455/10 |
| 2003/0176171 A1 | * | 9/2003 | Sato et al. | 455/130 |
| 2004/0240532 A1 | * | 12/2004 | Reznik et al. | 375/148 |

FOREIGN PATENT DOCUMENTS

EP   1172957   1/2002

* cited by examiner

*Primary Examiner*—Khanh C Tran
(74) *Attorney, Agent, or Firm*—Lisa K. Jorgenson; Allen, Dyer, Doppelt, Milbrath & Gilchrist, P.A.

(57) ABSTRACT

A receiver includes an input for receiving an input signal including a plurality of symbols from a plurality of multi-path transmission channels, and a plurality of fingers are connected to the input. Each finger includes a plurality of demodulation units assigned to the plurality of multi-path transmission channels for demodulation thereof, and each demodulation unit includes a channel correction circuit. A shared memory is upstream from the channel correction circuits and is shared by the demodulation units for performing a delay function therefore. A controller successively time-division multiplexes read and write access operations to the shared memory during successive time slots so that one symbol, for each active multi-path transmission channel, can be read and written during each time slot.

19 Claims, 6 Drawing Sheets

METHOD OF DELAYING SYMBOLS WITHIN A "RAKE" RECEIVER, AND CORRESPONDING "RAKE" RECEIVER

FIELD OF THE INVENTION

The invention relates to the processing of incident signals within a signal receiver, and advantageously applies to a receiver that combines several components of multi-path signals that are mutually delayed by different time delays before reaching the receiver.

Such a receiver is present in code division multiple access (CDMA) wireless communication systems, for example, and is currently designated by those skilled in the art as a "Rake" receiver. The invention relates more particularly to the signal processing that takes place in the demodulation units of the different "fingers" of these "Rake" receivers.

BACKGROUND OF THE INVENTION

In a wireless communication system, a base station communicates with a plurality of remote terminals, such as cellular mobile telephones. Frequency division multiple access (FDMA) and time division multiple access (TDMA) are the conventional multiple access systems for delivering simultaneous services to a certain number of terminals. The basic idea underlying the FDMA and TDMA systems includes dividing the available resource, respectively into several frequencies or into several time slots, such that several terminals can operate simultaneously without causing interference.

Telephones operating according to the GSM standard belong to the FDMA and TDMA systems in the sense that transmission and reception takes place at different frequencies, and also in different time slots. Unlike the systems using frequency division or time division, CDMA systems (code division multiple access) enable multiple users to share a common frequency and a common time channel by using a coded modulation. Among the CDMA systems are the CDMA 2000 system, the WCDMA system (wide band CDMA) and the IS-95 standard.

In CDMA systems, as is well known to those skilled in the art, a scrambling code is associated with each base station and is used to distinguish one base station from another. In addition, an orthogonal code, known to those skilled in the art as the OVSF code, is allocated to each remote terminal (such as a cellular mobile telephone). All the OVSF codes are mutually orthogonal which distinguishes one channel from another. Before transmitting a signal over the transmission channel to a remote terminal, the signal has been scrambled and spread by the base station using the scrambling code of the base station and the OVSF code of the channel.

In CDMA systems, we can still distinguish those that use a distinct frequency for transmission and reception (CDMA-FDD system) from those which use a common frequency for transmission and reception, but distinct time domains for transmission and reception (CDMA-TDD system). The invention applies advantageously to communication systems of the CDMA type, and more particularly, to systems of the WCDMA type with terrestrial radio access (UTRA FDD/TDD).

The incident signal received by a mobile telephone for example comprises different versions delayed in time from the signal initially transmitted. These versions are the result of the multi-path transmission characteristics of the transmission environment between a base station and the telephone. Each path introduces a different delay.

The Rake receiver in a cellular mobile telephone operating in a CDMA communication system is used to carry out temporal alignment, descrambling, compression, channel correction and combination of the delayed versions of the initial signals to deliver the information streams (symbols) contained in the initial signals.

A Rake receiver is usually made up of several fingers. Each finger is designed to demodulate a given path received at a given moment. Baseband demodulation essentially includes descrambling and compressing. Then, the signal, after compression, undergoes a channel correction, which usually includes a phase correction and an amplitude correction. All these operations relating to demodulation are carried out, within each finger, in several units of demodulation respectively associated with different physical transmission channels.

Furthermore, the channel estimate based on the channel corrections which will be made is produced in parallel on a window comprising a predetermined number of symbols of a pilot channel, for example 10 symbols. If the signal in each demodulation unit is not delayed before making the channel correction, then the channel correction for a symbol is made by using an estimate made on only the 10 symbols preceding the symbol.

Also, provision is usually made to delay the symbol before channel correction so as to make the channel correction with the estimate made on the five symbols of the pilot channel preceding the symbol in question and on the next five. In this regard, provision is currently made for one memory per channel, i.e., one memory per demodulation unit in each finger of the receiver. This leads to considerable memory sizes and consequently to a significant surface congestion on the silicon.

SUMMARY OF THE INVENTION

In view of the foregoing background, an object of the present invention is to overcome the above described problem associated with one memory per demodulation unit in each finger of a Rake receiver.

This and other objects, advantages and features in accordance with the present invention are provided by a Rake receiver comprising a signal input for receiving an incident signal formed of symbols emanating from several multi-path transmission channels respectively assigned several spread factors, and fingers connected to the signal input. Each finger may comprise a predetermined number of demodulation units. Each demodulation unit may be capable of being assigned to a transmission channel to demodulate at a given moment a given path of that transmission channel. The Rake receiver may further comprise channel correction means and delay means disposed upstream of the correction means for delaying the signal by a predetermined delay. The delay may correspond to half the size of the window used for the channel estimate, for example.

According to a general characteristic of the invention, the delay means of all the demodulation units of a finger are formed by a single port shared memory, the size of which is compatible with a predetermined maximum data bit rate.

Furthermore, the finger comprises control means capable, during successive time slots having a duration equal to the minimal duration of a symbol corresponding to a predetermined minimal spread factor, of successively time-division multiplexing the read and write access operations to the memory so that one symbol, for each active channel, can be read and written during each time slot. The sequence of the read access operations may be identical to the sequence of the write access operations, and each symbol read may correspond to a symbol written and delayed by the predetermined delay.

In other terms, the invention provides for managing the delaying of the signals before phase correction by using a single memory per finger, for example an SRAM memory, single port, shared by all the demodulation units of a finger. In combination with this single memory, there is provision for read and write access control to read and write the symbols in the memory according to the same sequence, which preserves the consistency of the data of each channel.

The size of the memory will be easily chosen by those skilled in the art according to the maximum data bit rate, taking into account all the possible channel combinations. As an indication, for a CDMA FDD type transmission, the maximum number of data elements in a frame (10 ms) is always 19.2 kilobits, irrespective of the number of channels. So, for four channels, the invention enables the use of a memory with a size one quarter as large as in the prior art which provides one memory per channel.

A maximum bit rate of 19.2 kilobits per frame is the equivalent for example of a single active channel having a spread factor of 4, which means that a symbol lasts 4 chips, or of two active channels simultaneously each having a spread factor of 8, or of four active channels simultaneously having respectively spread factors of 8, 16, 32 and 32, or each having a spread factor of 16. In this case, the minimum spread factor possible will be 4.

According to one embodiment of the invention, the control means may comprise a write pointer incremented on each write access operation and a read pointer incremented on each read access operation. These two pointers initially point to the same address, for example address zero. Processing means are furthermore capable of processing the symbols of an active channel during a predetermined part of the time slot assigned to that channel. So, more precisely and as an example, when four channels provide a symbol at the same time, one channel will be processed (in write and read mode) per chip, that is, during a part of the time slot the duration of which corresponds to that of a chip. For example, channel 1 will be processed during chip 0, channel 2 during chip 1, channel 3 during chip 2 and channel 4 during chip 3.

Furthermore, the processing means comprise write control means capable, in the presence of a channel activation signal, of writing a symbol of that channel during a first predetermined sub-part of the part of a time slot. For example, each chip will be subdivided into four sub-chips and the memory will be written in the presence of a sub-chip equaling 1.

Finally, read control means are capable, in the presence of the channel activation signal delayed by the predetermined delay (for example, corresponding to half of the channel estimate window), of reading that symbol occurring during a second predetermined sub-part of the part of another time slot. In fact, since the signal must be delayed, it is during a later time slot that there will be a read of the symbol that was previously written in the memory. For the read of this symbol, a moment will be chosen corresponding to a sub-chip value of 2, for example.

Naturally, during the same time slot, a symbol will be read in the memory and a symbol will be written in the memory relative to the same active channel. However, the read symbol will correspond to a symbol written during a previous time slot and delayed by the predetermined delay.

The first sub-part (sub-chip) is for example identical for all the channels, and the second sub-part (sub-chip) is also identical for all the channels. The symbols are usually conveyed in successive frames divided into chips. Each symbol has a duration equivalent to a number of chips corresponding to the spread factor of the channel in question.

According to one embodiment of the invention, the write and read control means comprise a first cyclical counter incremented at the rate of the chips, and first comparison means to compare, for each channel, a number of bits of the value of the counter with a reference value, for example the value 0. The number of bits is defined based on the value of the spread factor of the channel in order to deliver a signal representative of the rate of arrival of the symbols from that channel. Provision is also made for a second cyclical counter rated at a multiple frequency, for example a quadruple frequency, of the chip frequency, and reinitialized on the occurrence of each new chip.

Write enable means are then capable of enabling a write signal when the value of the second counter is equal to a first predetermined reference value, for example the value 1 in decimal notation. Read enable means are capable of enabling a read signal when the value of the second counter is equal to the predetermined second reference value, for example the value 2 in decimal notation.

The receiver is advantageously implemented in the form of an integrated circuit. The invention also proposes a component of a wireless communication system, for example a cellular mobile telephone, incorporating a receiver as defined above.

The invention also proposes a method of delaying symbols processed by a Rake receiver, comprising reception of an incident signal formed of symbols emanating from several multi-path transmission channels respectively assigned several spread factors, demodulating at a given moment of a given path of a transmission channel, application of a channel correction, and delaying the phase of the signal by a predetermined delay before application of the channel correction.

According to a general characteristic of the invention, the delay phase comprises, during successive time slots having a duration equal to the minimal duration of a symbol corresponding to a predetermined minimal spread factor, successive time-division multiplexings of the read and write access operations to a single port shared memory dedicated to all the channels. This memory has a size compatible with a predetermined maximum data bit rate. This is so that one symbol, for each active channel, can be read and written during each time slot. The sequence of read access operations is identical to the sequence of write access operations, and each symbol read corresponds to a symbol written and delayed by the predetermined delay.

According to one embodiment of the invention, in the delay phase, a write pointer is incremented on each write access operation and a read pointer on each read access operation. The symbols of an active channel are processed during a predetermined part of the time slot assigned to that channel, and, in the presence of a channel activation signal, a symbol of that channel is written in the memory during a first predetermined sub-part of the part of a time slot, and, in the presence of the channel activation signal delayed by the predetermined delay, that symbol is read during a second predetermined sub-part of the part of another time slot.

According to one embodiment of the invention, the symbols are conveyed in successive frames divided into chips, with each symbol having a duration equivalent to a number of chips corresponding to the spread factor of the channel in question. In the delay phase, a first cyclical counter is incremented at the chip rate. For each channel a number of bits of the value of the first counter is compared with a reference value, for example the value 0. The number of bits is defined based on the value of the spread factor of the channel to deliver a signal representative of the rate of arrival of the symbols of that channel. A second cyclical counter is rated at a multiple frequency of the chip frequency and this second counter is reinitialized on the occurrence of each new chip. A write signal is enabled when the value of the second counter is equal to a first predetermined reference value, and a read signal is enabled when the value of the second counter is equal to a second predetermined reference value.

BRIEF DESCRIPTION OF THE DRAWINGS

Other advantages and characteristics of the invention will appear on examination of the detailed description of the embodiments and of implementation which are in no way limiting, and of the appended drawings, in which.

DETAILED DESCRIPTION OF THE PREFERRED EMBODIMENTS

Figure 1:
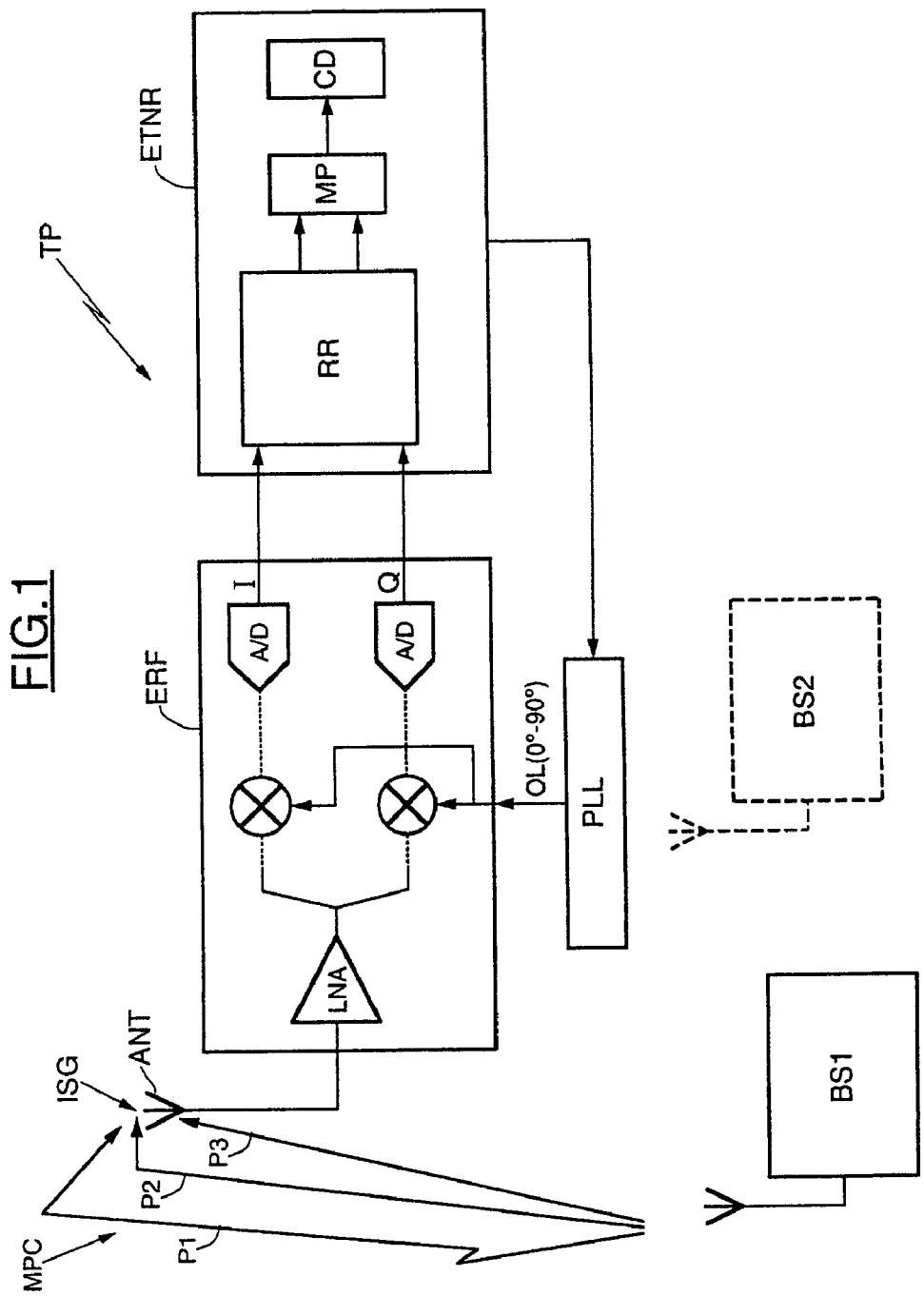
FIG. 1 illustrates schematically a cellular mobile telephone incorporating a Rake receiver according to the invention.

In FIG. 1, the reference TP designates a remote terminal, such as a cellular mobile telephone, which is in communication with a base station BS1, for example according to a CDMA-FDD type communication system. The cellular mobile telephone comprises, in conventional fashion, an analog radio frequency stage ERF connected to an antenna ANT to receive an input signal ISG.

Figure 2:
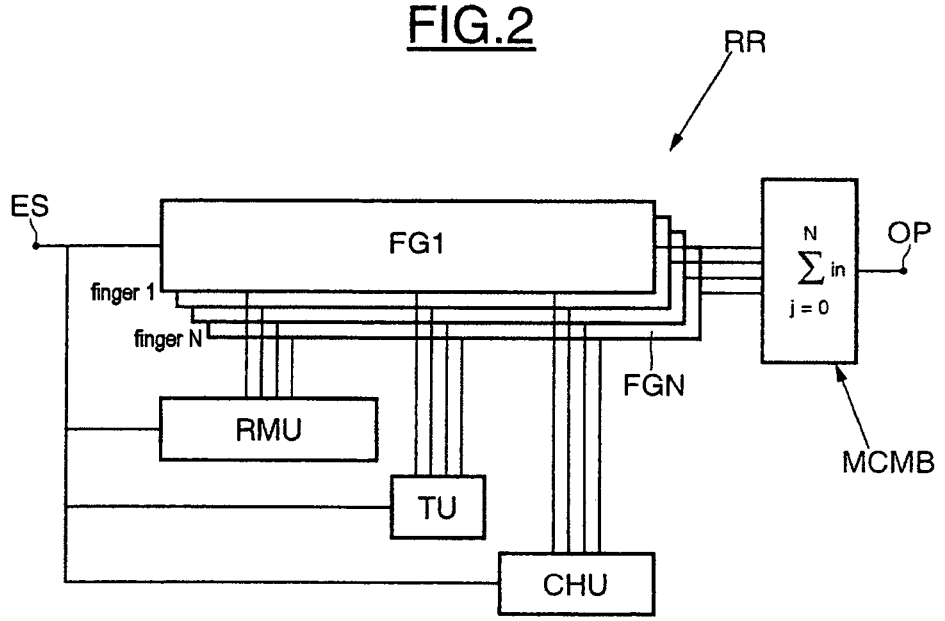
FIGS. 2 to 4 illustrate schematically the functionalities and an internal architecture of a Rake receiver according to the invention.

Conventionally, the ERF stage comprises a low noise amplifier LNA and two processing channels comprising mixers, filters and conventional amplifiers (not represented in FIG. 2). The two mixers respectively receive from a phase locked loop PLL two signals mutually presenting a phase difference of 90°. After frequency transposition in the mixers, the two processing channels respectively define two streams I (direct stream) and Q (quadrature phase stream) as readily understood by those skilled in the art.

After digital conversion in analog/digital converters, the two streams I and Q are delivered to a reception processing stage ETNR. This processing stage ETNR comprises a receiver RR commonly called by those skilled in the art as a Rake receiver, followed by conventional means of demodulation MP which demodulate the spectrum delivered by the Rake receiver RR. The demodulation means MP are followed by a conventional channel decoder CD.

Because of possible reflections of the signal initially transmitted on obstacles situated between the base station and the mobile telephone, the transmission environment is in fact a multi-path transmission environment MPC, that is, comprising several different transmission paths (three transmission paths P1, P2, P3 are shown in FIG. 1). As a consequence, the signal ISG which is received by the mobile telephone comprises different versions delayed in time from the signal initially transmitted. These versions are the result of the characteristics of multi-path transmission of the transmission environment. Each path introduces a different delay. Naturally, the received signal ISG could also result from the transmission of initial signals respectively transmitted by different base stations BS1 and BS2.

FIG. 2 illustrates schematically the basic functions of the Rake receiver RR, which is formed of several fingers (here N fingers) FG1-FGN. Each finger is designed to demodulate a given path received at a given moment and comprises, as will be seen below, several demodulators. Each demodulator is assigned to a physical transmission channel. Baseband demodulation essentially comprises descrambling and compression. The compression is a correlation and requires an integration on the symbol period. The receiver then combines the information received on each finger in combination means MCMB, by aggregating them after having corrected the phase and amplitude distortions of each path (unit CHU described below). Naturally, the multiple fingers represented in FIG. 2 may be formed of the same physical finger, reconfigured N times to produce the N functional fingers. The receiver also comprises a unit CHU for supplying a transmission channel estimate for correcting the channel distortions.

It is necessary to detect the paths with the greatest energy and allocate them to the fingers. This is done by a control unit RMU of known structure. Finally, since the timing relating to the paths may vary over time, a tracking unit also of known structure monitors the timing of the paths and updates the fingers with that information.

Figure 3:
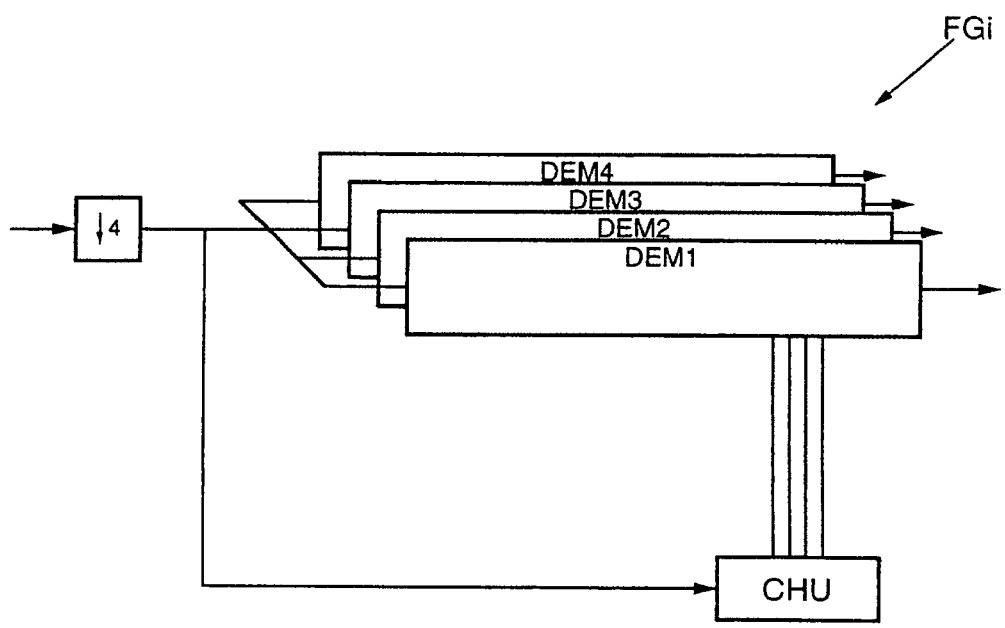

In FIG. 3, each finger FGi comprises a code generator CG for producing mainly the scrambling codes and the OVSF codes, a sub-sampler, in this instance a sub-sampler by four, disposed at the input of the finger, as well as a channel estimation unit CHU.

Furthermore, the finger FGi comprises several physical transmission channel demodulators, in this case four demodulators DEM1-DEM4. Each channel demodulator performs the functions of descrambling, compression and integration as well as the previously mentioned channel correction functions. The unit CHU is shared by all the physical transmission channels.

Figure 4:
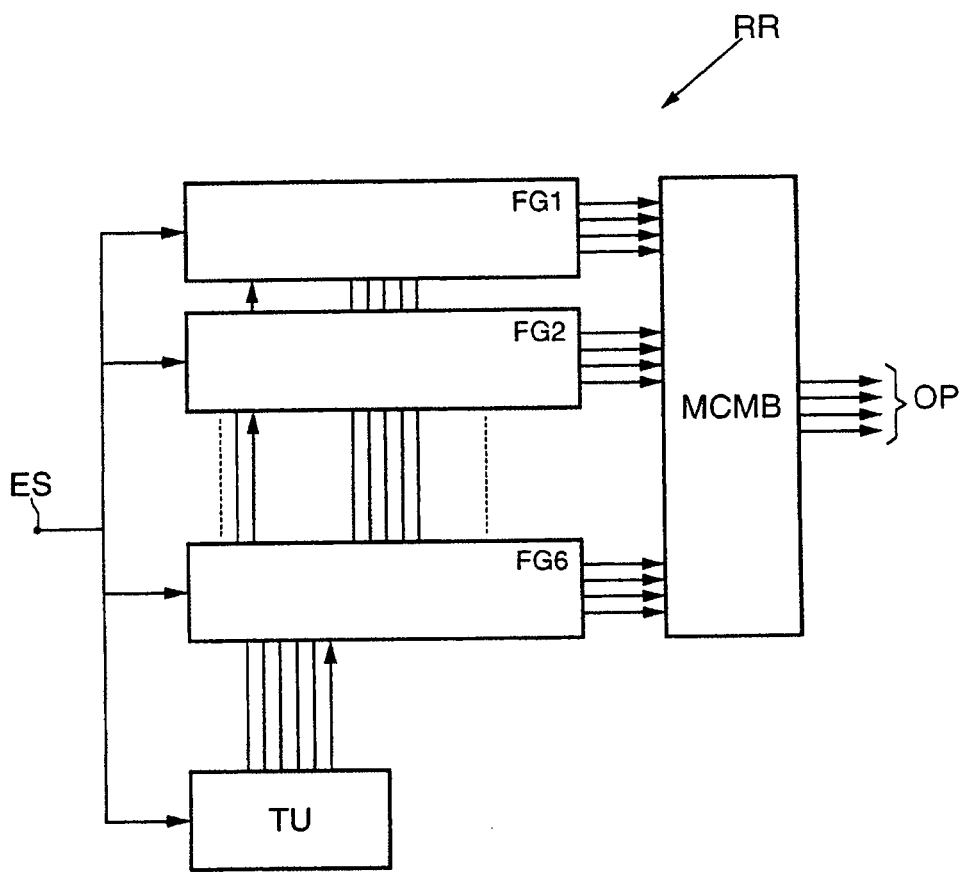

Referring now to FIG. 4, which partially illustrates an example of internal architecture of a Rake receiver RR according to the invention, we see that between the signal input ES and the output OP which delivers the information relating to the different physical transmission channels (in this case four physical channels), are the fingers of the receiver. In this case six fingers FG1-FG6 are connected at the output to the combination means MCMB. The combination means MCMB is of conventional structure, and are designed to combine the delayed versions of the initial signals in order to deliver the symbols contained in the initial signals.

The combination means MCMB are made of as many combination units as there are physical channels. A combination unit is connected to the six counterpart demodulators respectively contained in the six fingers FG1-FG6. Such a combination unit is for example described in French patent application number 0212025, which is assigned to the current assignee of the present invention and is incorporated herein by reference in its entirety.

By referring in greater detail to FIGS. 5 and 6, a management system will now be described for delaying, within the demodulation units of each finger, the symbols of the different channels, by a predetermined delay TS typically equal to half the channel estimate window.

Figure 5:
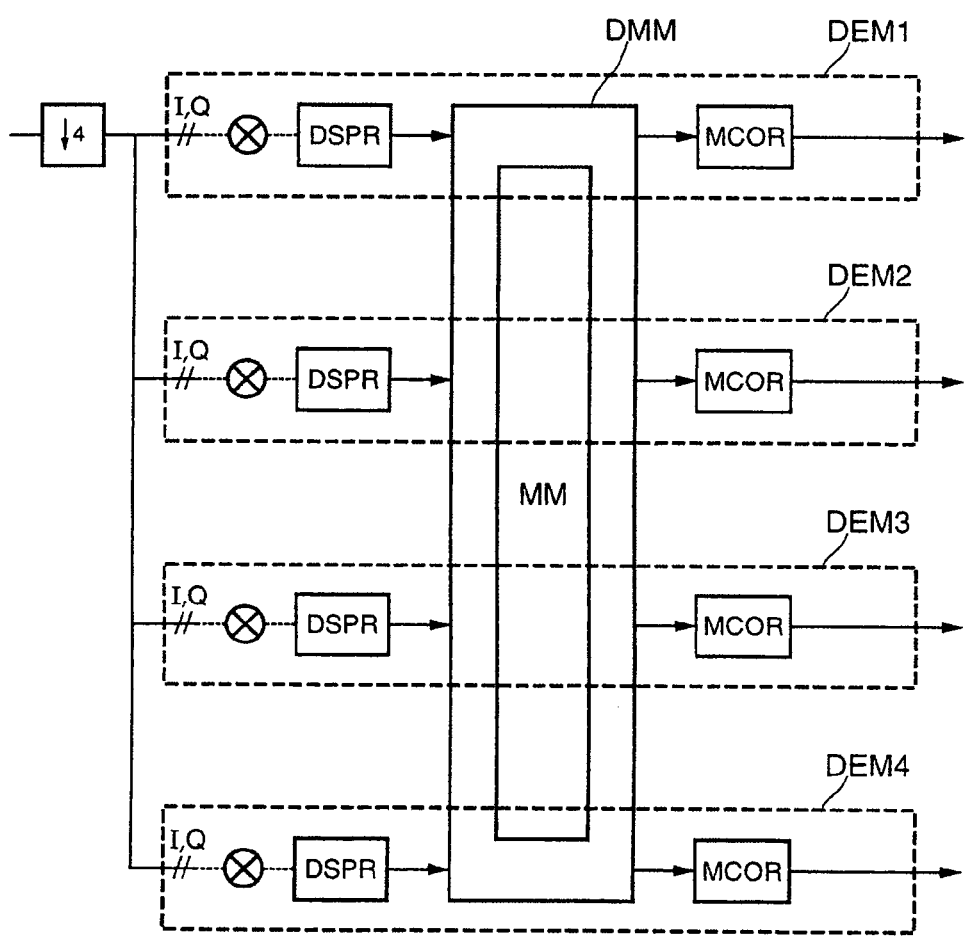
FIG. 5 illustrates in greater detail an embodiment of a device for controlling the signal delay comprising a shared memory according to the invention.
Figure 6:
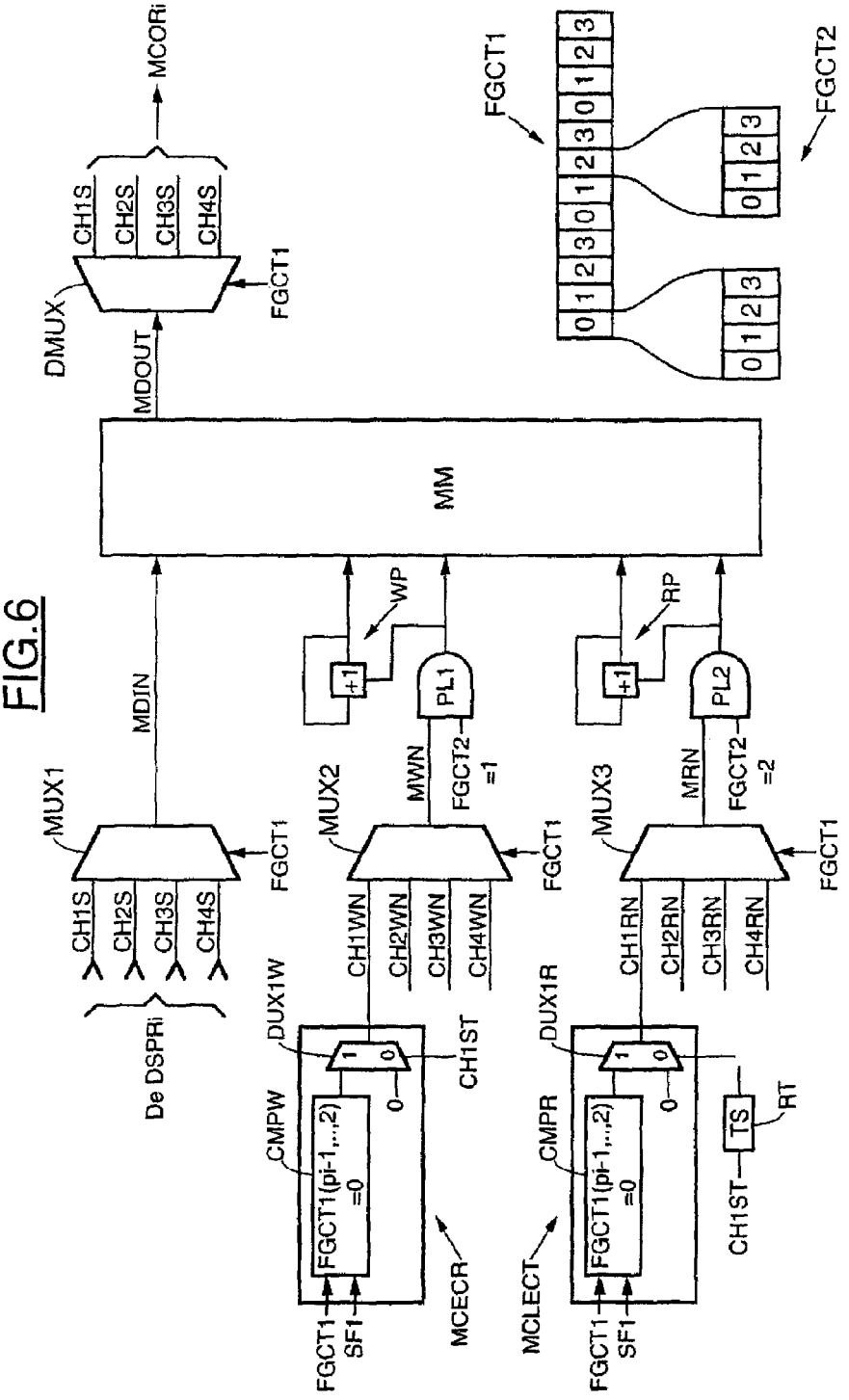
FIG. 6 illustrates in greater detail how the read and write access operations of the shared memory in FIG. 5 can be controlled.

In the nonlimitative example which will now be described, as illustrated in FIG. 5, each finger FGi comprises four demodulation units DM1-DM4 each assigned to a physical transmission channel. As indicated above, each demodulation unit DMi comprises means for taking account of the OVSF codes as well as means for compression DSPR, of conventional structure, as well as means for correction MCOR designed to apply phase and amplitude corrections taking into account the channel estimate.

Furthermore, according to the invention, the finger FGi comprises a shared memory MM which may be a random access memory of the SRAM type, single port, that is, allowing only one access at a time in both a read or a write mode. This memory is common to all the demodulation units of the finger and its read and write access operations are controlled by control means DMM, a typical structure of which is illustrated in FIG. 6.

It should be noted that, in systems of the WCDMA type, time is divided into frames. Each frame is divided into slots, and each slot comprises 2560 chips. In the case of a UTRA FDD system, the duration of a chip is 260.417 ns. With a spread factor of 4 (each symbol is formed of four chips), the duration of a symbol is therefore approximately 1.04 microseconds.

In the example described herein, the memory MM is capable of storing 320 symbols for all the channels. In fact, 320 symbols (5×256: 4) have been obtained in the worst case with a predetermined delay (half the channel estimate window) corresponding to 5 pilot symbols, of 256 chips each and a channel spread factor of 4.

In this example, since the smallest spread factor is 4, it means that two consecutive symbols are at least 4 chips apart. As a consequence, according to the invention, the means of control are capable of reading a symbol in the memory and writing a symbol in the memory for each channel during a time slot having a duration of 4 chips.

This is the reason why a provision is made to use two counters, that is, a first counter FGCT1 which is a chip counter, set at zero at the beginning of each slot and incremented as the chips arrive. This counter FGCT1 comprises for example 12 bits. For simplification purposes, in FIG. 6, we have shown in decimal notation only the value of the last two bits of this counter. So, in decimal notation, the value of these last two bits is incremented by 0 to 3 in cyclical fashion as the chips arrive.

Also provided is a second counter FGCT2 which is incremented at a frequency quadruple that of the chip frequency. For simplification purposes we have shown in FIG. 6 in decimal notation the last two bits of each counter FGCT2. This is reset to 0 on the occurrence of each chip and is incremented during each chip by 0 to 3.

Since all the channels must be processed during a time slot corresponding to 4 chips, we allocate a chip to each channel. In other terms, channel 1 will be processed when the value of the counter FGCT1 (the last two bits) is zero, channel 2 when the value of the counter FGCT1 is 1, channel 3 when the value of the counter FGCT1 is 2, and channel 4 when the value of the counter is 3.

Furthermore, a symbol will be written and read in the memory for a given channel within two distinct sub-parts (sub-chips) of the part (chip) allocated to that channel during the time slot of the four chips. More precisely, the write operation of each channel will be enabled when the value of the counter FGCT2 (the last two bits) is for example 1, whereas the read operation will be enabled when the value of the counter FGCT2 is 2.

Returning now to the structure of the control means DMM, a first multiplexer MUX1 receives respectively from the compression means $DSPR_i$ of each channel the symbols ChiS of those channels. The corresponding input selection takes place with the value of the counter FGCT1. Similarly, a demultiplexer DMUX, also controlled by the counter FGCT1, is used to deliver the output data element MDOUT of the memory MM, that is a channel symbol, to the correction means MCORi of the channel in question.

With respect to the write control means MCECR in the memory MM, comparison means CMPW are provided for each channel. These comparison means are capable of comparing a defined number of bits of the first counter FGCT1 with the value 0. This number of bits is defined based on the value of the channel spread factor. More precisely and as a non-limitative example, if the spread factor SFi of the channel i equals $2^{pi}$, then the bits of the counter FGCT1 to be compared with 0 will be the bits 2 to (pi–1), when pi is equal to or greater than 3.

When these bits equal 0, it marks the arrival of a new symbol to be written in the memory, and this signal does not last more than 4 chips. If this comparison is positive, the comparison means CMPW deliver the value 1 whereas they otherwise deliver the value 0.

A duplexer DUX1W has its input 1 connected to the output of the comparison means CMPW and its input 0 wired at a null value. This duplexer DUX1W is controlled by a channel activation signal CH1ST (channel start) representative of an active channel and delivered by the unit RMU.

If the channel is inactive, that is, if it has the value 0 for example, the channel write enable signal CH1WN (channel 1 write enable) has the value 0, which will not lead to the write operation in the memory MM. On the other hand, if the signal CH1ST equals 1, the value of the signal CH1WN depends on the value delivered by the comparison means CMPW. If this value equals 1, it means that we are effectively in the part of the time slot dedicated to the processing of channel 1. In the particular case of a spread factor equaling four (pi=2), we still deliver the value 1 at the input of the duplexer DUX1W.

The write control means also comprise a multiplexer MUX2 receiving the four write signals CH1WN-CH4WN and delivers at the output a memory write signal MWN (memory write enable). This multiplexer MUX2 is controlled by the value of the two low order bits (last two bits) of the counter FGCT1 which is used to select the channel during the chip assigned to that channel.

The signal MWN attacks a first input of a logical AND port, referenced PL1. The second input of that logical port PL1 receives the comparison between the value of the counter FGCT2 and the value 1. If this comparison is positive, the second input of the logical port PL1 receives the value 1 and 0 otherwise.

As a consequence, a write access to the memory MM occurs only if the signal MWN is at 1 and if the value of the counter FGCT2 equals 1. In this case, the data element MDIN delivered by the multiplexer MUX1 and corresponding for example to a symbol CH1S of channel 1, will then be written in the memory MM at the address designated by a write pointer WP which will then be incremented by one unit.

In regards to the read control means MCLECT, they present a structure analogous to that of the write control means MCECR. More precisely, we find the comparison means CMPR, analogous to the comparison means CMPW and the duplexer DUX1R, analogous to the duplexer DUX1W. However, this time the duplexer DUX1R is time controlled by the signal CH1ST (with respect to channel 1) and is delayed by the delay TS corresponding to 5 symbols of the pilot channel. In hardware terms, the delay TS can be obtained by an offset register RT. The channel read signals CHiRN are delivered to the inputs of a multiplexer MUX3 analogous to the multiplexer MUX2. The memory read signal MRN attacks a logical port PL2 analogous to the logical port PL1. However, the second input of this logical port PL2 this time receives the comparison of the value of the counter FGCT2 with the value 2.

In a manner analogous to that described for the logical port PL1, a read access is obtained when the two inputs of the logical port PL2 are at 1. The output data element MDOUT is then extracted from the memory at the address pointed to by a read pointer RP. This read pointer RP is then incremented by one unit.

The write pointer WP and read pointer RP are initialized at the same address, for example at address 0, on initialization. In this way, when the counter FGCT1 takes the value 0 and the counter FGCT2 takes the value 1, a symbol of the channel 1 is written in the memory MM. When the counter FGCT2 takes the value 2, a symbol of the channel 1 is read corresponding to the symbol that was written in the memory M for this channel but delayed by the delay TS.

When the counter FGCT1 takes the value 1, channel 2 is processed in an analogous manner and so on until the counter FGCT1 takes the value 3 corresponding to the processing of channel 4. Then the cycle recommences. According to the invention, the symbols of the different channels are mixed in the memory and the write access sequence is the same as the read access sequence, to within a delay TS, which means that consistency of the data of each channel is maintained.

That which is claimed is:

1. A receiver comprising:
    an input for receiving an input signal comprising a plurality of symbols from a plurality of multi-path transmission channels; and
    a plurality of fingers connected to said input, each finger comprising
        a plurality of demodulation units assigned to the plurality of multi-path transmission channels for demodulation thereof, each demodulation unit comprising a channel correction circuit,
        a shared memory upstream from said channel correction circuits and being shared by said plurality of demodulation units for performing a delay function therefor, and
        a controller for successively time-division multiplexing read and write access operations to said shared memory during successive time slots so that one symbol, for each active multi-path transmission channel, can be read and written during each time slot;
    wherein each multi-path transmission channel has a spread factor associated therewith; and
    wherein the successive time slots have a duration equal to a minimal duration of a symbol corresponding to a minimal spread factor.

2. A receiver according to claim 1 wherein said shared memory comprises a single port memory.

3. A receiver according to claim 1 wherein a size of said shared memory is based upon a maximum data bit rate.

4. A receiver according to claim 1 wherein a sequence of read access operations is identical to a sequence of write access operations, and each symbol being read corresponds to a symbol written and delayed by a predetermined delay.

5. A receiver according to claim 1 wherein said controller comprises:
    a write pointer incremented on each write access operation;
    a read pointer incremented on each read access operation; and
    a processing circuit for processing the symbols of an active multi-path transmission channel during part of the time slot assigned to that multi-path transmission channel, said processing circuit comprising
        a write controller, in the presence of a channel activation signal, for writing a symbol of the multi-path transmission channel during a first sub-part of the part of the time slot, and
        a read controller, in the presence of the channel activation signal delayed by a predetermined delay, for reading the symbol occurring during a second sub-part of the part of another time slot.

6. A receiver according to claim 5 wherein the first sub-part is identical for all the multi-path transmission channels, and the second sub-part is identical for all the multi-path transmission channels.

7. A receiver according to claim 5 wherein the symbols are conveyed in successive frames divided into chips, each symbol having a duration equivalent to a number of chips corresponding to a spread factor of the multi-path transmission channel in question; and wherein said write and read controllers each comprises:
    a first cyclical counter incremented at a rate of the chips;
    a first comparator comparing for each multi-path transmission channel a value of said first cyclical counter with a reference value, this value being defined based on a value of the spread factor of the multi-path transmission channel, and for delivering a signal representative of a rate of arrival of the symbols from that multi-path transmission channel;
    a second cyclical counter operating at a multiple frequency of a chip frequency and reinitialized on the occurrence of each new chip;
    a write enabler for enabling a write signal when the value of said second cyclical counter is equal to a first reference value; and
    a read enabler for enabling a read signal when the value of said second cyclical counter is equal to a second reference value.

8. A receiver according to claim 1 wherein said plurality of fingers are formed as an integrated circuit.

9. A receiver comprising:
    an input for receiving an input signal comprising a plurality of symbols from a plurality of multi-path transmission channels; and
    a plurality of fingers connected to said input, each finger comprising
        a plurality of demodulation units assigned to the plurality of multi-path transmission channels for demodulation thereof, each demodulation unit comprising a channel correction circuit,
        a shared memory upstream from said channel correction circuits and being shared by said plurality of demodulation units for performing a delay function therefor, and
        a controller for successively time-division multiplexing read and write access operations to said shared memory during successive time slots so that one symbol, for each active multi-path transmission channel, can be read and written during each time slot, said controller comprising
            a write pointer incremented on each write access operation,
            a read pointer incremented on each read access operation, and
            a processing circuit for processing the symbols of an active multi-path transmission channel during part of the time slot assigned to that multi-path transmission channel;
    wherein each multi-path transmission channel has a spread factor associated therewith; and wherein the successive time slots have a duration equal to a minimal duration of a symbol corresponding to a minimal spread factor.

10. A receiver according to claim 9 wherein said processing circuit comprises:
   a write controller, in the presence of a channel activation signal, for writing a symbol of the multi-path transmission channel during a first sub-part of the part of the time slot, and
   a read controller, in the presence of the channel activation signal delayed by a predetermined delay, for reading the symbol occurring during a second sub-part of the part of another time slot.

11. A receiver according to claim 10 wherein the symbols are conveyed in successive frames divided into chips, each symbol having a duration equivalent to a number of chips corresponding to a spread factor of the multi-path transmission channel in question; and wherein said write and read controllers each comprises:
   a first cyclical counter incremented at a rate of the chips;
   a first comparator comparing for each multi-path transmission channel a value of said first cyclical counter with a reference value, this value being defined based on a value of the spread factor of the multi-path transmission channel, and for delivering a signal representative of a rate of arrival of the symbols from that multi-path transmission channel;
   a second cyclical counter operating at a multiple frequency of a chip frequency and reinitialized on the occurrence of each new chip;
   a write enabler for enabling a write signal when the value of said second cyclical counter is equal to a first reference value; and
   a read enabler for enabling a read signal when the value of said second cyclical counter is equal to a second reference value.

12. A cellular mobile telephone comprising:
   a radio frequency stage for receiving an input signal comprising a plurality of symbols from a plurality of multi-path transmission channels; and
   a processing stage connected to said radio frequency stage and comprising a receiver comprising
      a plurality of fingers for receiving the input signal, each finger comprising
         a plurality of demodulation units assigned to the plurality of multi-path transmission channels for demodulation thereof, each demodulation unit comprising a channel correction circuit,
         a shared memory upstream from said channel correction circuits and being shared by said plurality of demodulation units for performing a delay function therefor, and
         a controller for successively time-division multiplexing read and write access operations to said shared memory during successive time slots so that one symbol, for each active multi-path transmission channel, can be read and written during each time slot;
   wherein each multi-path transmission channel has a spread factor associated therewith; and
   wherein the successive time slots have a duration equal to a minimal duration of a symbol corresponding to a minimal spread factor.

13. A cellular mobile telephone according to claim 12 wherein a sequence of read access operations is identical to a sequence of write access operations, and each symbol being read corresponds to a symbol written and delayed by a predetermined delay.

14. A cellular mobile telephone according to claim 12 wherein said controller comprises:
   a write pointer incremented on each write access operation;
   a read pointer incremented on each read access operation; and
   a processing circuit for processing the symbols of an active multi-path transmission channel during part of the time slot assigned to that multi-path transmission channel, said processing circuit comprising
      a write controller, in the presence of a channel activation signal, for writing a symbol of the multi-path transmission channel during a first sub-part of the part of the time slot, and
      a read controller, in the presence of the channel activation signal delayed by a predetermined delay, for reading the symbol occurring during a second sub-part of the part of another time slot.

15. A cellular mobile telephone according to claim 14 wherein the symbols are conveyed in successive frames divided into chips, each symbol having a duration equivalent to a number of chips corresponding to a spread factor of the multi-path transmission channel in question; and wherein said write and read controllers each comprises:
   a first cyclical counter incremented at a rate of the chips;
   a first comparator comparing for each multi-path transmission channel a value of said first cyclical counter with a reference value, this value being defined based on a value of the spread factor of the multi-path transmission channel, and for delivering a signal representative of a rate of arrival of the symbols from that multi-path transmission channel;
   a second cyclical counter operating at a multiple frequency of a chip frequency and reinitialized on the occurrence of each new chip;
   a write enabler for enabling a write signal when the value of said second cyclical counter is equal to a first reference value; and
   a read enabler for enabling a read signal when the value of said second cyclical counter is equal to a second reference value.

16. A method for delaying symbols processed by a receiver comprising a plurality of fingers connected to an input, each finger comprising a plurality of demodulation units with each demodulation unit comprising a channel correction circuit, the method comprising:
   receiving an input signal at the input, the input signal comprising a plurality of symbols from a plurality of multi-path transmission channels;
   demodulating the input signal using the plurality of demodulation units, each demodulation unit demodulating a path of one of the multi-path channels;
   applying channel correction in each finger using the channel correction circuits;
   delaying the input signal by a predetermined delay before applying the channel correction in each finger, the delaying being performed by a shared memory upstream from the channel correction circuits and being shared by the plurality of demodulation units; and
   successively time-division multiplexing read and write access operations to the shared memory during successive time slots so that one symbol, for each active multi-path transmission channel, can be read and written during each time slot;

wherein each multi-path transmission channel has a spread factor associated therewith; and wherein the successive time slots have a duration equal to a minimal duration of a symbol corresponding to a minimal spread factor.

17. A method according to claim 16 wherein a sequence of read access operations is identical to a sequence of write access operations, and each symbol being read corresponds to a symbol written and delayed by a predetermined delay.

18. A method according to claim 16 wherein the successive time-division multiplexing comprises;

incrementing a write pointer on each write access operation;

incrementing a read pointer on each read access operation; and processing the symbols of an active multi-path transmission channel during part of the time slot assigned to that multi-path transmission channel, the processing comprising writing a symbol of the multi-path transmission channel during a first sub-part of the part of the time slot in the presence of a channel activation signal, and reading the symbol occurring during a second sub-part of the part of another time slot in the presence of the channel activation signal delayed by a predetermined delay.

19. A method according to claim 18 wherein the symbols are conveyed in successive frames divided into chips, each symbol having a duration equivalent to a number of chips corresponding to the spread factor of the multi-path transmission channel in question; and wherein the writing and reading of a symbol each comprises:

incrementing a first cyclical counter at a rate of the chips;

comparing for each multi-path transmission channel a value of the first cyclical counter with a reference value, this value being defined based on a value of the spread factor of the multi-path transmission channel, and for delivering a signal representative of a rate of arrival of the symbols from that multi-path transmission channel;

operating a second cyclical counter at a multiple frequency of a chip frequency and reinitialized on the occurrence of each new chip;

enabling a write signal when the value of the second cyclical counter is equal to a first reference value; and enabling a read signal when the value of the second cyclical counter is equal to a second reference value.

* * * * *